(12) United States Patent
Gooijer (10) Patent No.: US 9,097,373 B2
(45) Date of Patent: Aug. 4, 2015

(54) ASSEMBLY FOR TRANSFERRING FLUIDS BETWEEN A VESSEL AND A TURRET STRUCTURE MOUNTED IN SAID VESSEL

(71) Applicant: Bluewater Energy Services B.V., Hoofddorp (NL)

(72) Inventor: Lambert Erik Gooijer, Amstelveen (NL)

(73) Assignee: Bluewater Energy Services B.V., Hoofddorp (NL)

( * ) Notice: Subject to any disclaimer, the term of this patent is extended or adjusted under 35 U.S.C. 154(b) by 0 days.

(21) Appl. No.: 14/200,333

(22) Filed: Mar. 7, 2014

(65) Prior Publication Data
US 2014/0261825 A1 Sep. 18, 2014

(30) Foreign Application Priority Data

Mar. 12, 2013 (EP) ..................... 13158774

(51) Int. Cl.
*B63B 21/50* (2006.01)
*F16L 27/08* (2006.01)
*B63B 22/02* (2006.01)

(52) U.S. Cl.
CPC ........... *F16L 27/0804* (2013.01); *B63B 21/507* (2013.01); *B63B 22/021* (2013.01)

(58) Field of Classification Search
USPC .................................. 114/230.12; 441/3, 4, 5
See application file for complete search history.

(56) References Cited

U.S. PATENT DOCUMENTS

| 3,525,312 | A | * | 8/1970 | Beck et al. ........................ 441/5 |
| 5,651,708 | A | | 7/1997 | Borseth |
| 5,755,607 | A | * | 5/1998 | Boatman et al. ................. 441/5 |
| 5,823,837 | A | | 10/1998 | Boatman et al. |
| 6,093,068 | A | | 7/2000 | Turner et al. |
| 6,178,910 | B1 | | 1/2001 | Pollack |
| 8,118,632 | B2 | * | 2/2012 | De Baan et al. ................. 441/4 |
| 2003/0167996 | A1 | | 9/2003 | McCollum et al. |
| 2004/0244986 | A1 | | 12/2004 | Poldervaart et al. |

FOREIGN PATENT DOCUMENTS

| EP | 0921062 | 6/1999 |
| WO | 9418065 | 8/1994 |
| WO | 9965762 | 12/1999 |
| WO | 03064244 | 8/2003 |

OTHER PUBLICATIONS

Search Report for corresponding foreign application EP13158774.3, filed Mar. 12, 2013.

* cited by examiner

*Primary Examiner* — Lars A Olson
(74) *Attorney, Agent, or Firm* — Steven M. Koehler; Westman, Champlin & Koehler, P.A.

(57) ABSTRACT

An assembly for transferring fluids between a vessel and a turret structure mounted in said vessel for a rotation around a substantially vertical turret axis is provided. Said turret structure comprises a swivel having at least one fluid outlet which is connected with one end of a fluid piping of which the second end is connected to the vessel. The assembly further comprises a flexible bridge member connecting a part of the turret structure with the vessel. The rotation of said part of the turret structure around the turret axis is substantially locked to the rotation of the vessel while a relative displacement between said part of the turret structure and the vessel or the structure fixed to the vessel is allowed. Said bridge member supports the fluid piping to substantially take away the loads from the fluid piping on the said swivel and its outlets.

20 Claims, 7 Drawing Sheets

ASSEMBLY FOR TRANSFERRING FLUIDS BETWEEN A VESSEL AND A TURRET STRUCTURE MOUNTED IN SAID VESSEL

BACKGROUND

The discussion below is merely provided for general background information and is not intended to be used as an aid in determining the scope of the claimed subject matter.

Aspects of the present invention relate to an assembly for transferring fluids between a vessel and a turret structure mounted in said vessel for a rotation around a substantially vertical turret axis, wherein said turret structure comprises a swivel having at least one fluid path and wherein the fluid path is connected with one end of a fluid piping of which the second end is connected to the vessel.

It is noted that the indication "vessel" also may refer to parts or to a structure fixed to the vessel.

It is known in the offshore industry (and especially the production of fluids such as oil or gas) to use vessels comprising a turret structure mounted in a moon pool for a rotation around a substantially vertical turret axis. The turret structure (or a disconnectable buoy connected to a lower part thereof) may be moored to the seabed by mooring lines and connects risers through which the fluid is delivered to a fluid inlet in the geostationary part of the swivel, which typically is mounted on top of the turret structure or on top of a so-called turntable which is based on and forms part of the turret structure. The fluid is transferred from the rotating part of the swivel to appropriate equipment on board of the vessel through fluid piping connecting the swivel fluid outlet with the vessel (for example a so-called turret access structure, TAS). It is noted that the fluids can be transferred in two directions, both from the risers to the vessel and vice versa. For clarity only the direction towards the vessel is mentioned here, but it should be realised that the indications "inlet" and "outlet" are interchangeable.

The turret structure, including its turntable, the swivel as well as the vessel (for example the TAS) often are subject to considerable loads tending to deform said components. The loads can originate from, among others, gravity, motions, accelerations, vessel deformations, temperature differences, pressure, mooring forces, riser forces, waves, current and wind. Because these components generally have a different stiffness and will be subjected to different loads, their deformations will be different causing relative displacements between these components.

The relative deformations between the rotating part of the swivel and the vessel (or TAS) deform the fluid piping between them, which causes stresses on the swivel and its outlets. These stresses can be low when the piping is flexible and it thus easily conforms to the relative deformations, but can also be very high when the piping is substantially rigid, for example for high pressure piping with a large diameter. These stresses can interfere with the operation of the swivel, for example by damaging it or causing its seals to leak.

Known practice for reducing the mentioned stresses is to increase the flexibility of the fluid piping (for example by allowing multiple bends in the fluid piping with long piping sections between successive bends), together with anchor points for the fluid piping sufficiently far away from the swivel. However, adding such fluid piping lengths is expensive and increases the overall weight acting on top of the vessel or TAS, further increasing the detrimental deformation thereof with resulting increase of the relative deformation between the vessel (or TAS) and the swivel.

Another known practice for reducing these stresses is to increase the stiffness of the components (such as the turret structure and the TAS) in order to reduce their (relative) deformations. This, however, involves the use of extra material (such as steel) with an associated increase of cost and weight.

The effectiveness of the above known stress reduction methods decreases when the structures (TAS, vessel, turret, swivel etc) increase in size. Larger structures will undergo larger relative deformations, while more steel is required to stiffen them and/or more piping bends and lengths are needed to accommodate the relative deformations. This becomes prohibitive in terms of the required amount of constructive material (steel, piping), mass and cost.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

The assembly referred to above further comprises a flexible bridge member connecting a part of the turret structure with the vessel, wherein a rotation of said part of the turret structure around the turret axis is substantially locked to the rotation of the vessel while a relative displacement between said part of the turret structure and the vessel is allowed, and wherein said bridge member supports the fluid piping to substantially take away the loads from the fluid piping on the said swivel and its outlets.

The part of the turret structure connected to the vessel by the bridge member for example may be the rotating parts of the swivel. The bridge member may support the fluid piping in a manner allowing a relative displacement between the bridge member and the fluid piping.

It is noted that "locked to the rotation of the vessel" does not exclude the possibility of a (moderate) limited relative rotation between said part of the turret structure and the vessel (the allowable magnitude of which may depend from, among others, the flexibility of the fluid piping).

As a result of the provision of such a bridge member a substantially fixed anchor point is provided on the bridge member for the flexible fluid path between the swivel and the vessel (such as a TAS) which can take the piping loads from the relative deformations between components without the need for increasing the stiffness of such components and without adding extra lengths of fluid piping or extra bends, such that a minimal functional piping layout is sufficient.

In an embodiment of the assembly the bridge member is provided with at least one hinge member for allowing said relative displacement between said part of the turret structure and the vessel or the structure fixed to the vessel. For example, such a hinge member may be positioned at an end of the bridge member connecting to said part of the turret structure or connecting to the vessel or the structure fixed to the vessel, or the at least one hinge member may be positioned intermediate two opposite ends of the bridge member. The use of such a hinge member provides the required flexibility of the bridge member which otherwise may be constructed as a rigid part, while the bridge member nevertheless maintains its ability for an effective support of the fluid piping to take away the loads from the fluid piping on the said swivel and its outlets.

It is possible that the hinge member is defined by a classic hinge (for example comprising two parts connected by a hinge axis) or by a weakened part of the bridge simulating a hinge (for example specially oriented plating allowing a relative movement between parts connected thereto).

In another embodiment the bridge member is sufficiently long for achieving its flexibility for allowing said relative displacement between said part of the turret structure and the vessel or the structure fixed to the vessel without the need for hinge members. Of course, such an embodiment also may be combined with the use of hinge members, if required.

In another embodiment of the assembly, said part of the turret structure (to which the bridge member is connected) is a swivel tower mounted around the swivel and engaging the remainder of the turret structure by means of a swivel tower bearing, such that the swivel tower does not follow a rotation of the remainder of the turret structure around the turret axis. In this embodiment the swivel tower also could be seen as a part of the bridge member. The swivel tower bearing supports the swivel tower in all directions but the swivel tower maintains its orientation with respect to the vessel. Because, now, both the swivel tower and swivel are mounted on the turret structure, relative deformations between the swivel fluid outlet and the swivel tower are minimized (and therefore also relative deformations between the swivel and the bridge member which is connected to the swivel tower).

This swivel tower also serves to provide access to the swivel for maintenance, inspection etc.

In one embodiment the bridge member engages the swivel tower in such a manner that a rotation of the swivel tower around the turret axis is locked to the rotation of the vessel.

As an alternative or additionally, the swivel tower is connected to the vessel by a torsion lock mechanism which substantially ensures that the swivel tower and the vessel rotate in unison. Thus, such a torsion lock mechanism may prohibit a rotation of the swivel tower around the turret axis relative to the vessel. Said torsion lock mechanism may be passive or active.

Because, as explained above, the relative deformations between the swivel fluid outlet and the swivel tower are minimized, it is possible that the fluid piping is attached to the swivel tower in a stationary (substantially rigid) manner without causing substantial piping loads on the said swivel and its outlets. For example fluid piping support points may be placed on the swivel tower to relieve deformation loads (acting in the fluid piping and caused by the relative displacements between components, as elucidated before) on the swivel.

In case the relative deformations between the swivel fluid outlet and the swivel tower are still significant, for example when their axes of rotations are slightly misaligned, a pipe loop can be placed in or around the swivel tower. This loop has sufficient flexibility to accommodate their relative deformations without introducing unacceptable stresses on the swivel.

The swivel tower bearing may be located above, below or substantially at the level of a fluid inlet of the swivel. Such a fluid inlet also is referred to as an inlet collector.

In yet another embodiment of the assembly using a swivel tower, the bridge member or part thereof is capable of a rotation around a vertical axis. In such an embodiment the rotation of the swivel tower is substantially locked to the rotation of the vessel, albeit to a lesser degree than in the other embodiments. This allows the use of a bridge member with improved characteristics and simplified constructive layout.

For example, the bridge member may be connected to said structure fixed to the vessel through a joint, such as for example a ball joint or a universal joint, allowing rotations but preventing translations of the bridge member relative to said structure fixed to the vessel. The bridge member then may be rather stiff providing a good support for the fluid piping whilst the said structure can be constructed as a less complicated frame which is not loaded by torsion forces. As an alternative the bridge member itself may comprise such a universal joint between two adjacent bridge member parts, of which a first one is directly connected to the vessel and the second one is connected to the respective part of the turret structure (for example the swivel tower).

In an embodiment the swivel tower bearing is positioned on a swivel base part, which may be enlarged. Thus there may be provided a swivel base part with a diameter which is larger than the diameter of the remainder of the swivel, wherein the swivel tower bearing is positioned on said swivel base part. This increases the stability of the swivel tower (with respect to the swivel) and further reduces deformations between the swivel and the swivel tower.

It is also possible to conceive embodiments in which no swivel tower is present, but in which said part of the turret structure (to which the bridge member is connected) is defined by the rotating part(s) of the swivel.

Again, in such an embodiment it is conceivable that the bridge member engages the rotating parts of the swivel in such a manner that their rotation around the turret axis is substantially locked to the rotation of the vessel (and thus they rotate in unison with the vessel), or (additionally or not) that the rotating parts of the swivel are connected to the vessel by a torsion lock mechanism.

BRIEF DESCRIPTION OF THE DRAWINGS

Hereinafter aspects of the invention will be elucidated while referring to the drawing, in which.

DETAILED DESCRIPTION OF THE ILLUSTRATIVE EMBODIMENTS

Figure 1:
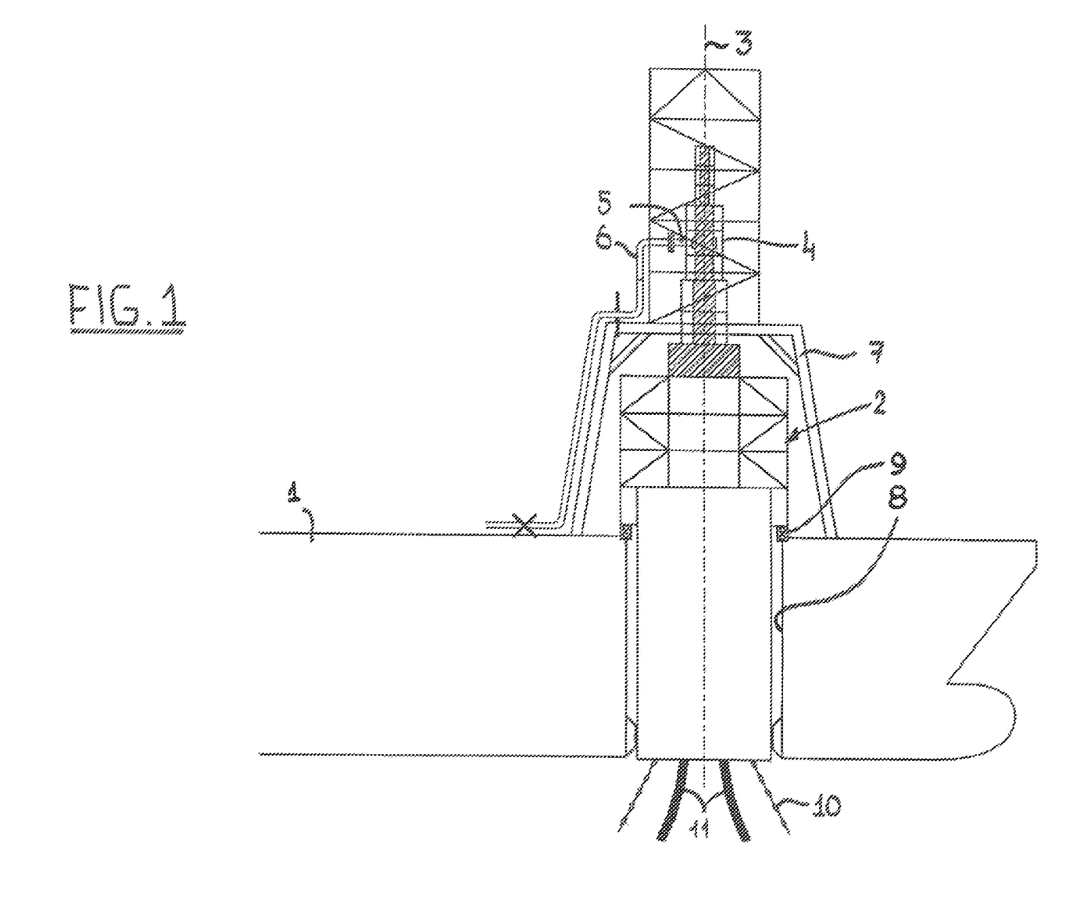
FIG. 1 schematically shows a state of the art assembly.

Firstly referring to FIG. 1, a state of the art assembly is illustrated for transferring fluids between a vessel 1 and a turret structure 2 mounted in said vessel for a rotation around a substantially vertical turret axis 3. In its upper part the turret structure 2 comprises a swivel 4 having at least one fluid outlet 5 which is connected to one end of a fluid piping 6 of which the second end is connected to the vessel 1 or to a structure 7 (for example a so-called turret access structure TAS) fixed to the vessel.

The turret structure 2 is mounted in a moonpool 8 by means of a turret bearing 9 and is moored to the seabed by mooring lines 10. Risers 11 extend from the seabed through the turret structure and are connected to a lower part (swivel fluid inlet, not shown in detail) of the swivel 4, whether or not through a process manifold.

The turret structure 2 allows the vessel to weathervane around the turret structure, as is generally known. The lower part of the turret structure 2 may be embodied as a disconnectable buoy part, as is generally known.

As will appear from the following description of embodiments of the assembly while referring to FIGS. 2-11, such an assembly further comprises a flexible bridge member 12 connecting a part of the turret structure 2 with the vessel 1 or a structure 7 fixed to the vessel 1. The assembly is constructed in such a way that a rotation of said part of the turret structure 2 around the turret axis 3 is substantially locked to the rotation of the vessel 1 while a relative displacement between said part of the turret structure 2 and the vessel 1 or the structure fixed to the vessel 1 is allowed, and wherein said bridge member 12 supports the fluid piping 6 in a manner allowing a relative displacement between the bridge member 12 and the fluid piping.

Firstly referring to FIG. 2, a bridge member 12 is shown comprising a vertical part 13 mounted to the vessel 1 through a hinge member 14 for allowing said relative displacement between said part of the turret structure 2 (a swivel tower 17 as will appear later) and the vessel 1. The bridge member 12 further comprises a horizontal part 15 which connects the vertical part 13 with said part of the turret structure 2. As seen in FIG. 3, the horizontal part 15 may be constructed from a number of interconnected bars 15', of which (in the illustrated embodiment) a central bar supports the fluid piping 6, preferably in a manner (guide 21) allowing a relative displacement between said bar 15' and the fluid piping 6. Likewise the vertical part 13 will support the fluid piping 6 in a corresponding manner (guide 22).

Figure 12:
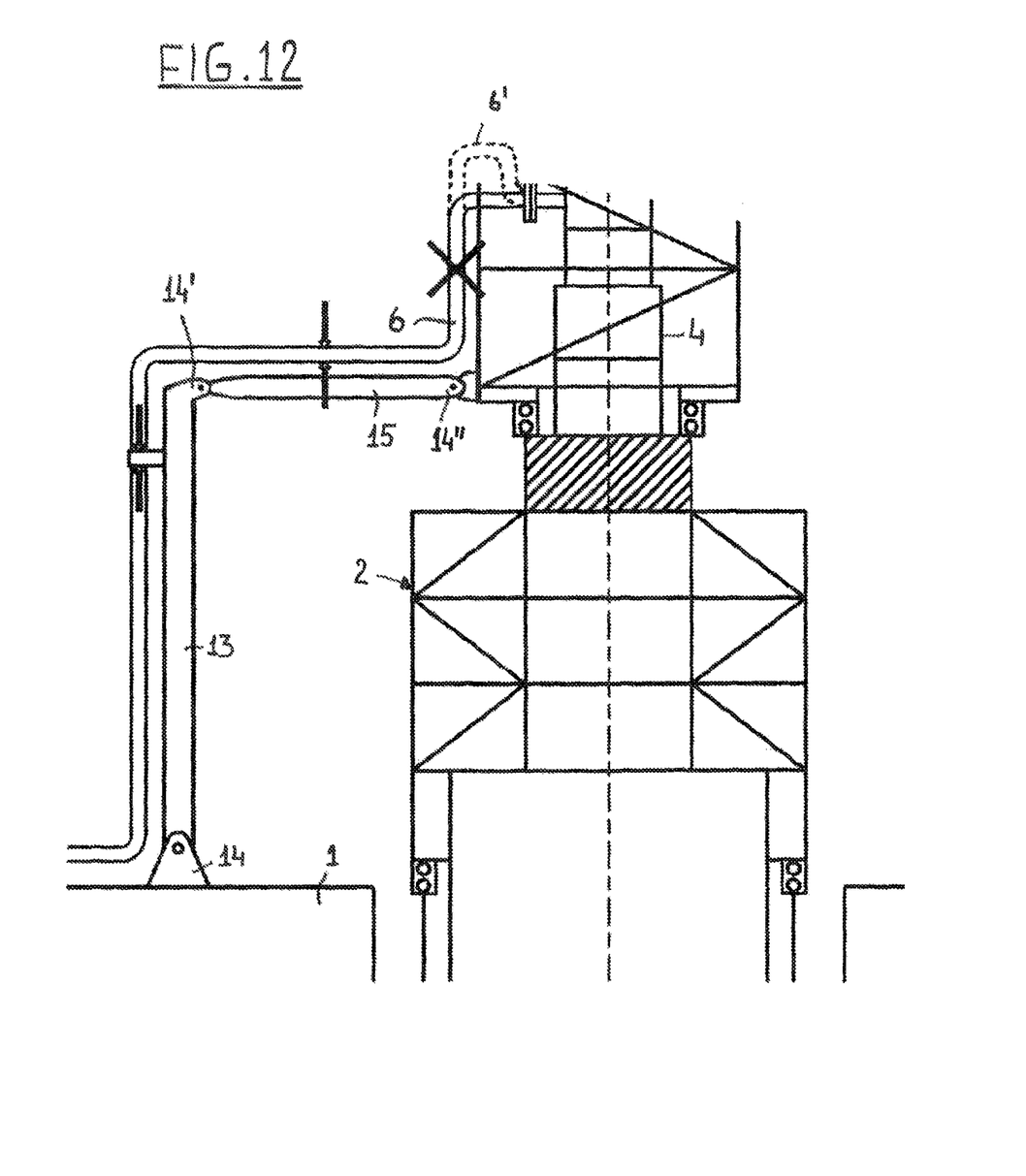
FIG. 12 shows alternative embodiments of hinge members and fluid piping.

The hinge member 14 also may be positioned intermediate the vertical and horizontal parts 13, 15, (at the location of deformable plate 16 discussed below) respectively, of the bridge member 12 or at the end of horizontal part 15 that is opposite to deformable plate 16 connecting horizontal part 15 to the turret structure 2. Such alternative positions of hinge members have been represented schematically as 14' and 14" in FIG. 12. FIG. 12 also shows a possible piping loop 6' connecting the fluid piping 6 to the swivel 4". Multiple hinge members may be provided too at different locations. Each hinge member 14 may be defined by a classic hinge (as illustrated) or by a weakened part (of the bridge member 12 or a component connected therewith) simulating a hinge (for example a deformable plate 16 between the vertical and horizontal bridge member parts 13 and 15).

Figure 2:
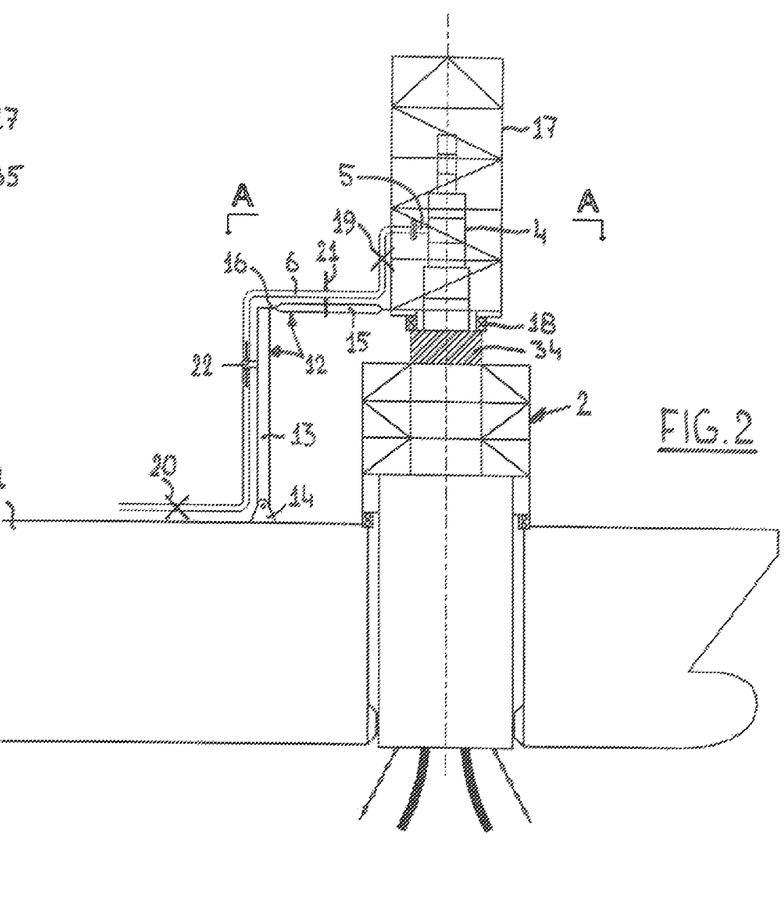
FIG. 2 schematically shows a first embodiment of the assembly.
Figure 3:
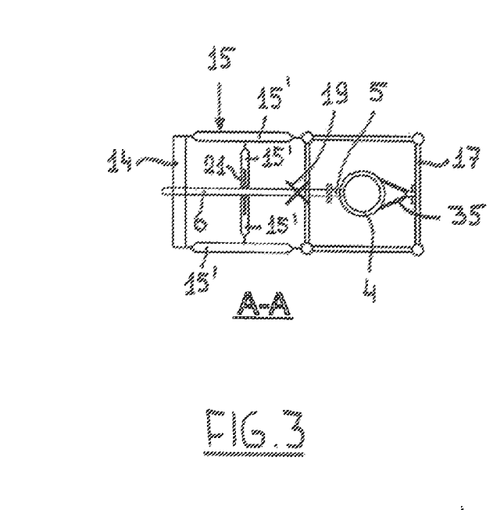
FIG. 3 shows a cross-section according to A-A in FIG. 2.

As illustrated in FIG. 2, said part of the turret structure 2 to which the bridge member 12 connects, is a swivel tower 17 mounted around the swivel 4 and engaging the remainder of the turret structure 2 by means of a swivel tower bearing 18. The swivel 4 may comprises a swivel base part 34 with a diameter which is larger than the diameter of the remainder of the swivel 4, wherein the swivel tower bearing 18 is positioned on said swivel base part 34. The swivel tower bearing 18 typically may be a roller type or sliding type bearing.

The bridge member 12, in one embodiment, engages the swivel tower 17 in such a manner that rotation of the swivel tower 17 around the turret axis 3 is substantially locked to the rotation of the vessel 1. As a result the swivel tower 17 does not (or only in a very limited sense) follow a rotation of the remainder of the turret structure 2 around the turret axis 3.

In the illustrated embodiment the fluid piping 6 is attached to the swivel tower 17 in a stationary manner, as illustrated by at least one support member 19. The position of such a support member, however, may vary and for example may be located on the bridge member 12. Further, such a support member also may provide a support allowing a moderate movement of the fluid piping 6. Correspondingly, the fluid piping 6 may be attached to the vessel 1 (support member 20).

FIG. 3 further illustrates swivel driver arms 35 connecting part of the swivel 4 to the swivel tower 17.

Figure 4:
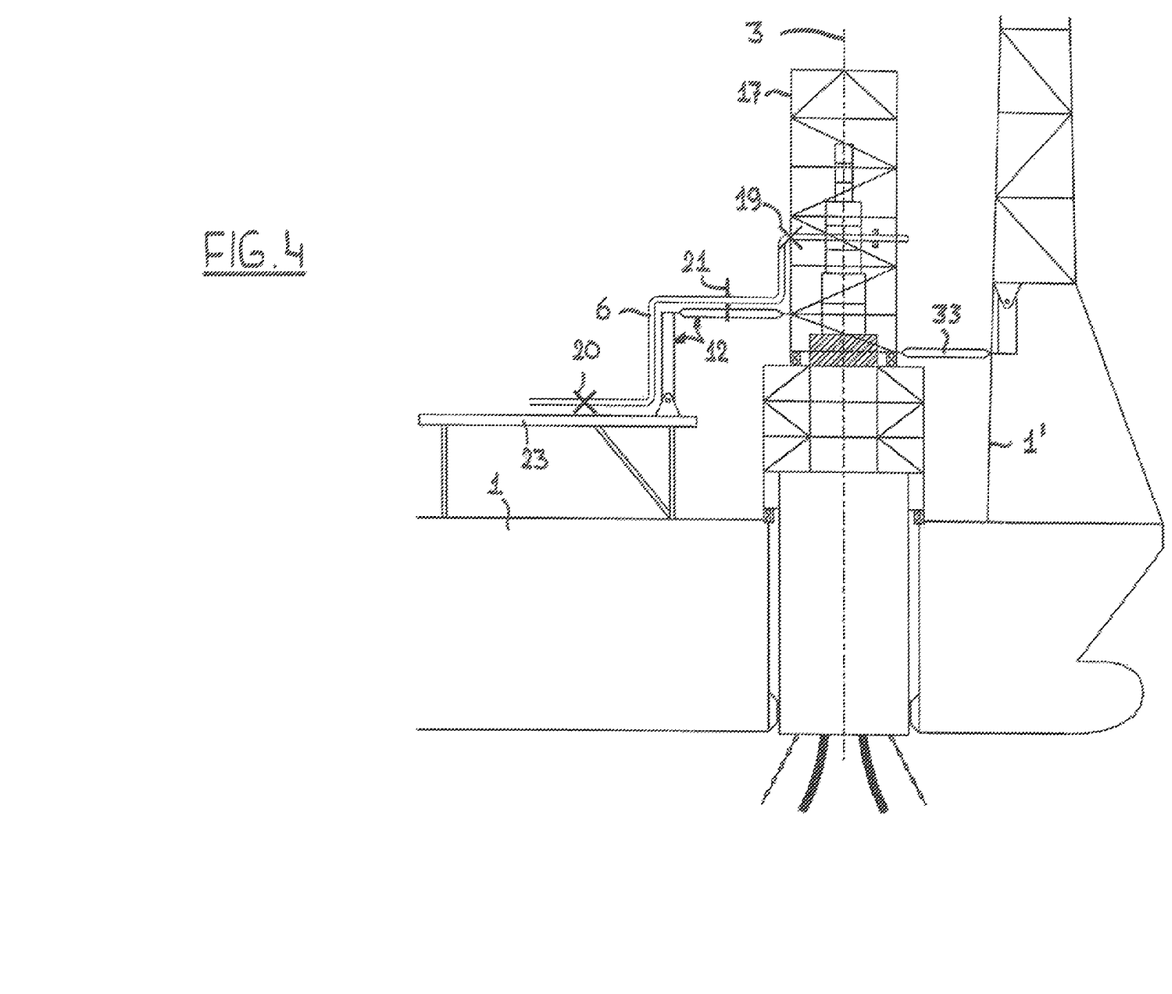
FIG. 4 schematically shows a second embodiment of the assembly.

FIG. 4 illustrates a second embodiment. The bridge member 12 now is supported by a structure 23 fixed to the vessel 1 (for example a module), but otherwise closely resembles the bridge member 12 of the previous embodiment. However, in this embodiment the swivel tower 17 is connected to the vessel 1 (or an auxiliary structure 1' thereof) by a torsion lock mechanism 33 (active or passive) for prohibiting a rotation of the swivel tower 17 around the turret axis 3. Thus, in this embodiment the bridge member 12 is not required to provide such a prevention of a rotation of the swivel tower 17 (but may or may not carry out such a function).

Figures 5, 6:
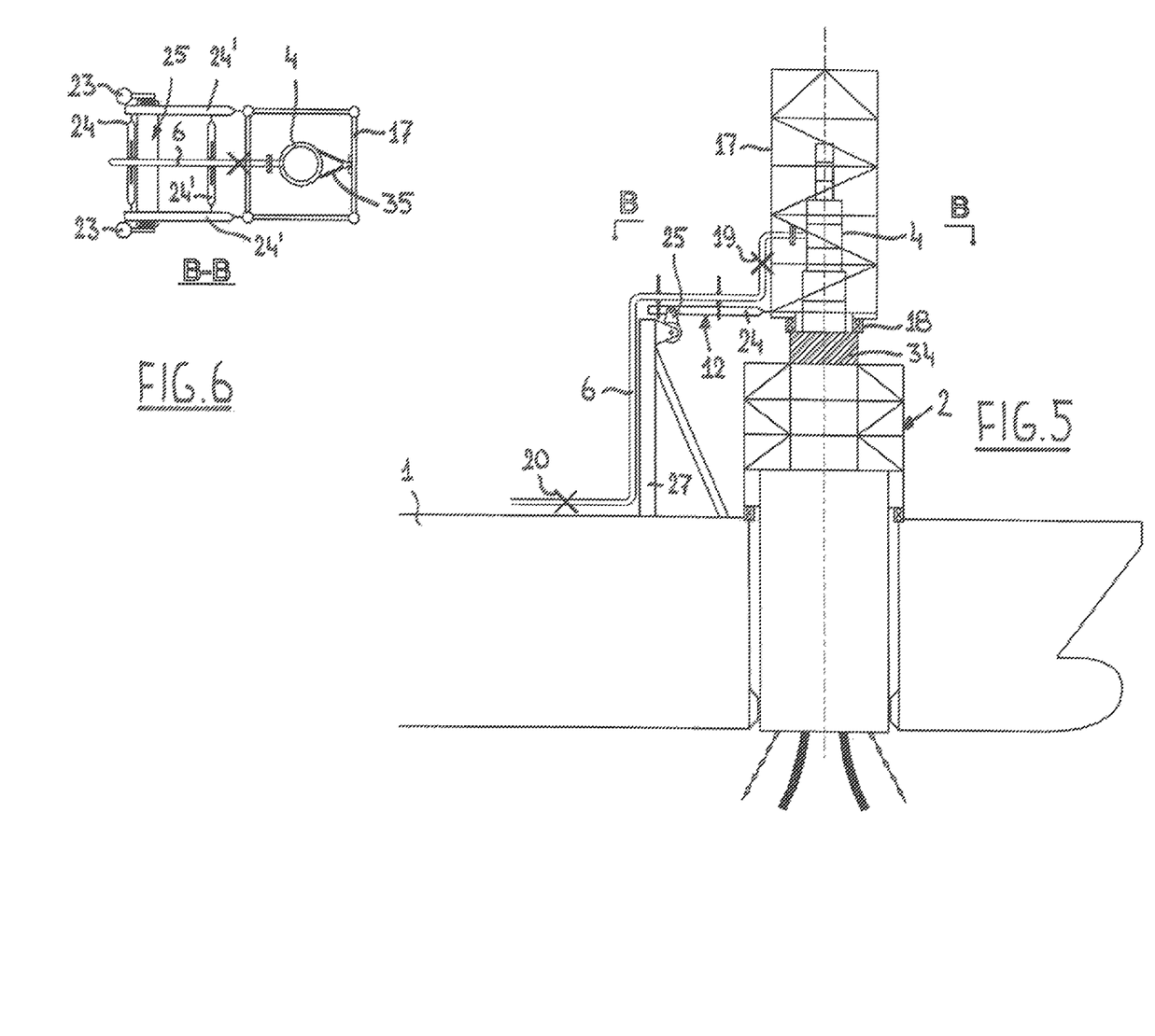
FIG. 5 schematically shows a third embodiment of the assembly.
FIG. 6 shows a cross-section according to B-B in FIG. 5.

FIGS. 5 and 6 show an embodiment of the assembly in which the bridge member 12 has a different layout. It comprises a horizontal part 24 (in this embodiment comprising bars 24') connecting with its one end to the swivel tower 17 and provided at its other end with a hinge mechanism 25 through which it is connected to a structure 27.

It is noted that in this embodiment it is also possible to say that the bridge member 12 comprises said horizontal part 24 and a vertical part 27 fixed to the vessel 1, with the hinge mechanism 25 in between said parts. This is merely a matter of definition.

Figure 7:
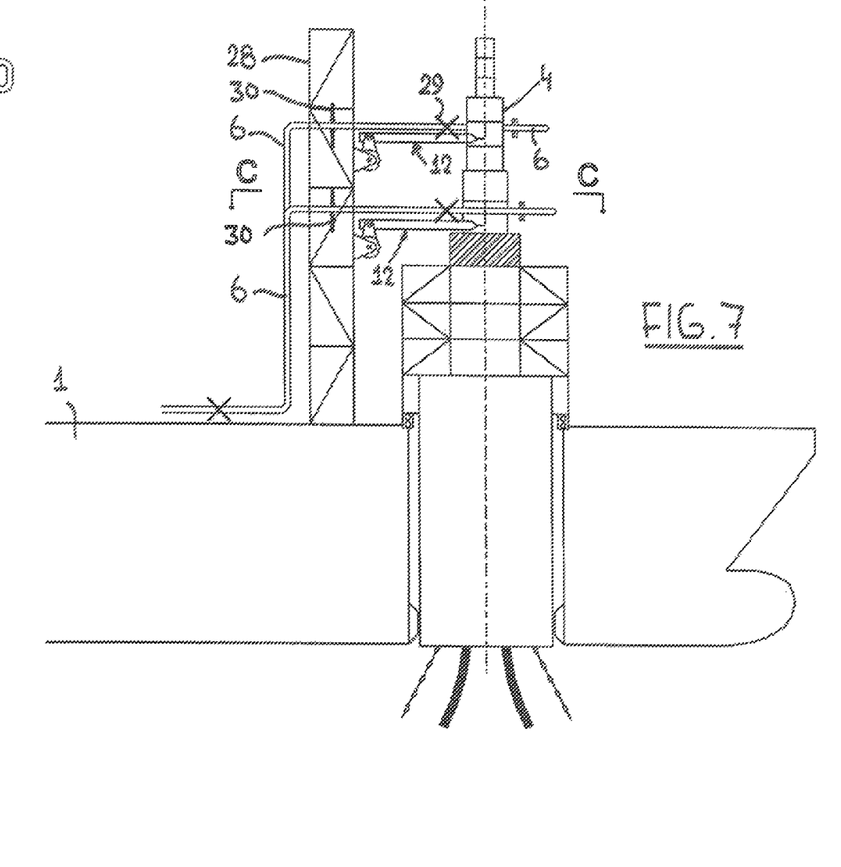
FIG. 7 schematically shows a fourth embodiment of the assembly.
Figure 8:
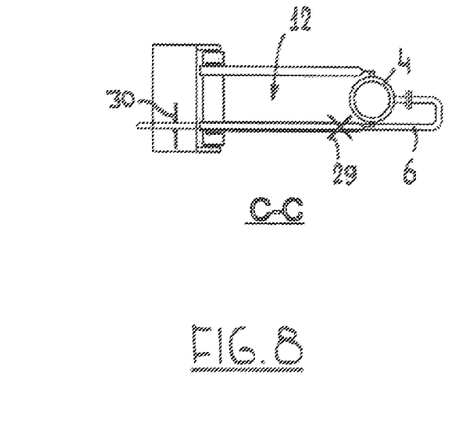
FIG. 8 shows a cross-section according to C_C in FIG. 7.

FIGS. 7 and 8 illustrate an embodiment in which there is no swivel tower, but in which the rotating parts of swivel 4 defines said part of the turret structure 2 to which the bridge member 12 is connected. In this embodiment the bridge member 12 engages the rotating parts of the swivel 4 in such a manner that their rotation is substantially locked to the rotation of the vessel 1. There actually are two bridge members 12 illustrated one above the other, each connected to the swivel 4 and comprising a structure 28, in a manner substantially corresponding to the previous embodiment and thus not elucidated here. It is noted, however, that such multiple bridge members 12 (of which there also may be provided only one or more than two, depending on the amount of fluid piping 6) may support a multitude of fluid piping 6 and may be separated (as shown) or combined (for example stacked one on top of the other). The fluid piping 6 may be connected to the bridge members 12 using support members 29, whereas guides 30 allow a relative movement between the structure 28 (which is considered to be a part of the bridge member 12) and the piping 6.

Figure 9:
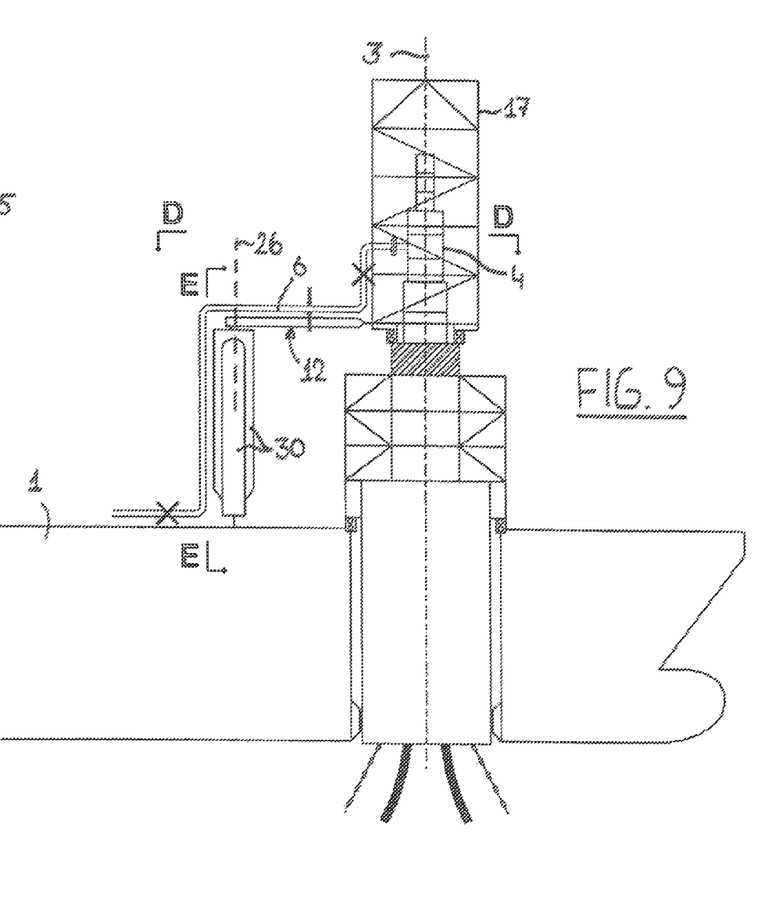
FIG. 9 schematically shows a fifth embodiment of the assembly.
Figure 10:
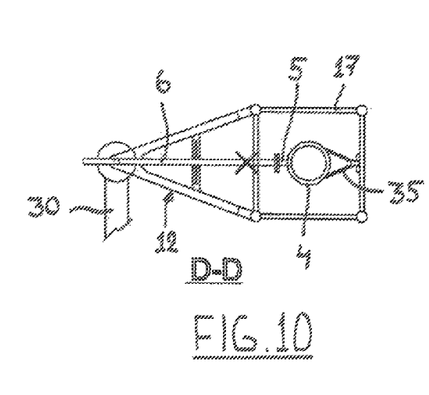
FIG. 10 shows a cross-section according to D_D in FIG. 9.
Figure 11:
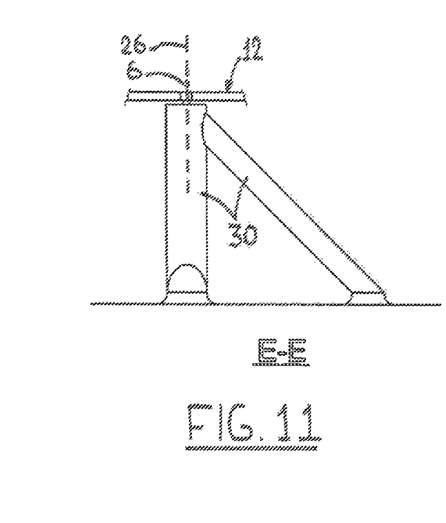
FIG. 11 shows a cross-section according to E_E in FIG. 9.

FIGS. 9-11, finally, illustrate an embodiment of the assembly, wherein a bridge member 12 is capable of a rotation around a vertical axis 26 defined by a structure 30 which is fixed to the vessel 1. The rotation may occur through a joint, such as for example a ball joint or a universal joint, allowing more rotations than only around a vertical axis 26 but preventing translations of the bridge member 12 relative to said structure 30 which is fixed to the vessel 1. As a result the bridge member 12 may be carried out relatively stiff, whereas the structure 30 will be free from swivel tower induced torsion loads and thus may be constructed less heavy.

It is noted that the bridge member in this embodiment also may be considered comprising the illustrated horizontal part 12 and the structure 30, with interposed universal joint.

In this embodiment it is also possible to omit the swivel tower 17, or to connect the swivel tower 17 to the vessel 1 by a torsion lock mechanism 33 (see FIG. 4) in order to lock the rotation of the rotating parts of the swivel 4 to the rotation of the vessel 1 around the turret axis 3.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. An assembly for transferring fluids between a vessel and a turret structure mounted in said vessel for a rotation around a substantially vertical turret axis, wherein said turret structure comprises a swivel having at least one fluid path and wherein the fluid path is connected with one end of a fluid piping of which the second end is connected to the vessel, wherein the assembly further comprises a flexible bridge member connecting a part of the turret structure with the vessel, wherein a rotation of said part of the turret structure around the turret axis is substantially locked to the rotation of the vessel while a relative displacement between said part of the turret structure and the vessel is allowed, and wherein said bridge member supports the fluid piping to substantially take away the loads from the fluid piping on the said swivel and its outlets.

2. The assembly according to claim 1, wherein the bridge member is provided with at least one hinge member for allowing said relative displacement between said part of the turret structure and the vessel or the structure fixed to the vessel.

3. The assembly according to claim 2, wherein the at least one hinge member is positioned at an end of the bridge member connecting to said part of the turret structure or connecting to the vessel or the structure fixed to the vessel.

4. The assembly according to claim 2, wherein the at least one hinge member is positioned intermediate two opposite ends of the bridge member.

5. The assembly according to claim 2, wherein the hinge member comprises a classic hinge or by a weakened part of the bridge member or a component connected therewith simulating a hinge.

6. The assembly according to claim 1, wherein the bridge member is sufficiently long for achieving its flexibility for allowing said relative displacement between said part of the turret structure and the vessel or the structure fixed to the vessel without the need for hinge members.

7. The assembly according to claim 1, wherein said part of the turret structure is a swivel tower mounted around the swivel and engaging the remainder of the turret structure by a swivel tower bearing, such that the swivel tower does not follow a rotation of the remainder of the turret structure around the turret axis.

8. The assembly according to claim 7, wherein the bridge member engages the swivel tower in such a manner that a rotation of the swivel tower around the turret axis is locked to the rotation of the vessel.

9. The assembly according to claim 7, wherein the swivel tower is connected to the vessel by a torsion lock mechanism which substantially ensures that the swivel tower and the vessel rotate in unison.

10. The assembly according to claim 7, wherein the fluid piping is attached to the swivel tower in a stationary manner to substantially take away the loads from the fluid piping on the said swivel and its outlets.

11. The assembly according to claim 7, wherein the fluid piping connects to the swivel through a piping loop present in or around the swivel tower.

12. The assembly according to claim 7, wherein the swivel tower bearing is located above the level of a fluid inlet of the swivel.

13. The assembly according to claim 7, wherein the swivel tower bearing is located below the level of a fluid inlet of the swivel.

14. The assembly according to claim 7, wherein the swivel tower bearing is located substantially at the level of a fluid inlet of the swivel.

15. The assembly according to claim 7, wherein the bridge member or part thereof rotates around a vertical axis.

16. The assembly according to claim 15, wherein the bridge member is connected to said structure fixed to the vessel through a joint allowing rotations but preventing translations of the bridge member relative to said structure fixed to the vessel.

17. The assembly according to claim 7, wherein the swivel tower bearing is positioned on a swivel base part.

18. The assembly according to claim 1, wherein said part of the turret structure is defined by rotating part(s) of the swivel.

19. The assembly according to claim 18, wherein the bridge member engages the rotating parts of the swivel in such a manner that their rotation around the turret axis is substantially locked to the rotation of the vessel.

20. The assembly according to claim 18, wherein the rotating part(s) of the swivel are substantially locked in rotation with the vessel by a torsion lock mechanism.

* * * * *